United States Patent
Shin et al.

(10) Patent No.: US 11,466,496 B2
(45) Date of Patent: Oct. 11, 2022

(54) DEVICE FOR OPENING AND CLOSING CHARGING DOOR

(71) Applicants: Hyundai Motor Company, Seoul (KR); Kia Motors Corporation, Seoul (KR)

(72) Inventors: Jae Dong Shin, Whasung-Si (KR); Seung Jun Yang, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 212 days.

(21) Appl. No.: 16/877,237

(22) Filed: May 18, 2020

(65) Prior Publication Data
US 2021/0246701 A1   Aug. 12, 2021

(30) Foreign Application Priority Data
Feb. 7, 2020   (KR) .................. 10-2020-0014815

(51) Int. Cl.
*B60L 53/00*   (2019.01)
*E05D 15/20*   (2006.01)
*E05F 15/665*  (2015.01)
*B60L 53/16*   (2019.01)

(52) U.S. Cl.
CPC .............. *E05D 15/20* (2013.01); *B60L 53/16* (2019.02); *E05F 15/665* (2015.01); *E05Y 2900/534* (2013.01)

(58) Field of Classification Search
CPC . B60K 2015/0523; B60L 53/16; E05D 15/20; E05D 15/18; E05F 15/67
USPC ................................... 74/29, 30, 422
See application file for complete search history.

(56) References Cited

U.S. PATENT DOCUMENTS 8,955,260 B2 * 2/2015 Newkirk .............. A61G 12/005
                                                      49/213
2017/0356228 A1 * 12/2017 Herczeg ................ B60K 15/05

FOREIGN PATENT DOCUMENTS

| CN | 112810473 A | * | 5/2021 | |
| GB | 2170553 A | * | 8/1986 | .............. E05F 15/67 |
| JP | 2010047378 A | * | 3/2010 | |
| KR | 10-2019425 B1 | | 9/2019 | |

* cited by examiner

*Primary Examiner* — Daniel J Troy
*Assistant Examiner* — Daniel Alvarez
(74) *Attorney, Agent, or Firm* — Morgan, Lewis & Bockius LLP

(57) ABSTRACT

A device configured for opening and closing a charging door may include a guide rail mounted to be long in a charging hole in a longitudinal direction thereof, an actuator configured to provide a driving force, and a charging door engaged to the actuator and configured to be concealed and moved in the charging hole along the guide rail according to the driving force received from the actuator in a state of being closed to open the charging hole.

14 Claims, 8 Drawing Sheets

DEVICE FOR OPENING AND CLOSING CHARGING DOOR

CROSS REFERENCE TO RELATED APPLICATION

The present application claims priority to Korean Patent Application No. 10-2020-0014815 filed on Feb. 7, 2020, the entire contents of which is incorporated herein for all purposes by this reference.

BACKGROUND OF THE INVENTION

Field of the Invention

The present invention relates to a device for opening and closing a charging door, which is capable of improving an opening structure of a charging door to prevent damage to charging portions and improving marketability of a structure of the charging door.

Description of Related Art

For charging an electric vehicle, a charging port is mounted in a charging hole, and a charging door is configured to be openable and closable in the charging hole to protect the charging port.

In the existing charging door, since the charging door is coupled around the charging hole in a single-axis hinge structure, when charging is required, the charging door is pivoted outward based on a hinge, and thus the charging hole is open. This is not significantly different from an opening method of manually opening the charging door and an opening method of automatically opening the charging door.

However, in such an opening structure of the charging door, when the charging door is open, since the charging door protrudes the outside of the charging hole, there is a concern in that interference of the charging door occurs when a charging gun enters, and thus a scratch or damage of the charging door may occur.

In particular, in the era of autonomous vehicles in the future, a charging system in which charging is automatically performed according to a customer need may be speculated. In such a charging system, when the charging gun automatically enters the charging hole and the charging door is automatically open, there is a problem in that the charging door and the charging gun collide with each other to cause damage to charging parts.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a device configured for opening and closing a charging door, which is configured for improving an opening structure of a charging door to prevent damage to charging portions and improving marketability of a structure of the charging door.

According to one aspect, there is provided a device configured for opening and closing a charging door includes a guide rail mounted to be long in a charging hole in a longitudinal direction thereof, an actuator configured to provide a driving force, and a charging door engaged to the actuator and configured to be concealed and moved in the charging hole along the guide rail according to the driving force received from the actuator in a state of being closed to open the charging hole.

The guide rail may include a pivoting guide section formed in an arc shape from the charging hole toward a charging port and configured to pivot and move the charging door along the pivoting guide section, and a linear guide section formed to extend linearly from a distal portion of the pivoting guide section and configured to linearly move the charging door along the linear guide section.

A guide roller coupled to the charging door, slidably engaged to the guide rail and configured to move along the guide rail may be provided, the driving force of the actuator may be provided at one end portion of the guide roller, and the charging door may be coupled to the other end portion of the guide roller and moved together with the guide roller.

A rack gear may be coupled to the one end portion of the guide roller, the rack gear may be provided in the same direction as the linear guide section, a pinion may be engaged with the rack gear, and the actuator may be coupled to the pinion so that the rack gear may be moved according to a rotational driving of the pinion.

A length of a shaft direction of the pinion engaged with the rack gear may be formed to be greater than a length of a width direction of the rack gear such that the rack gear may be moved in the width direction while being moved in the longitudinal direction during the movement of the rack gear along a path of the pivoting guide section.

Rail housings may be mounted on both internal sides of the charging hole, a plurality of guide rails having the same guide path may be formed on a front surface and a rear surface of each of the rail housings, and the guide rollers provided on the front and rear guide rails may be coupled to an upper end portion and a lower end portion of the charging door.

A charging information portion may be provided at a rim portion of the charging door.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
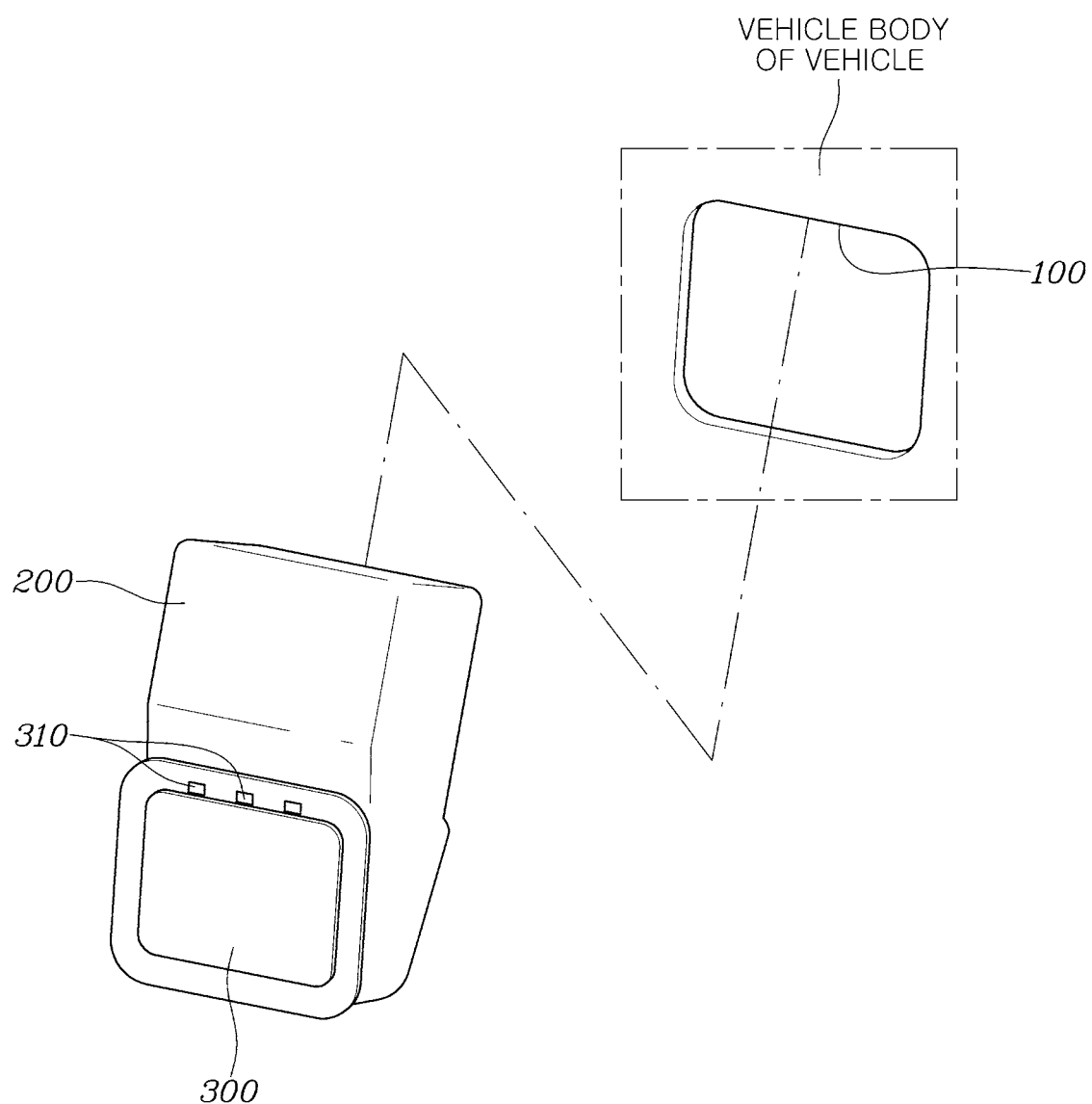
FIG. 1 is a diagram illustrating a state before a charging door is coupled to a charging hole according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

Figure 2:
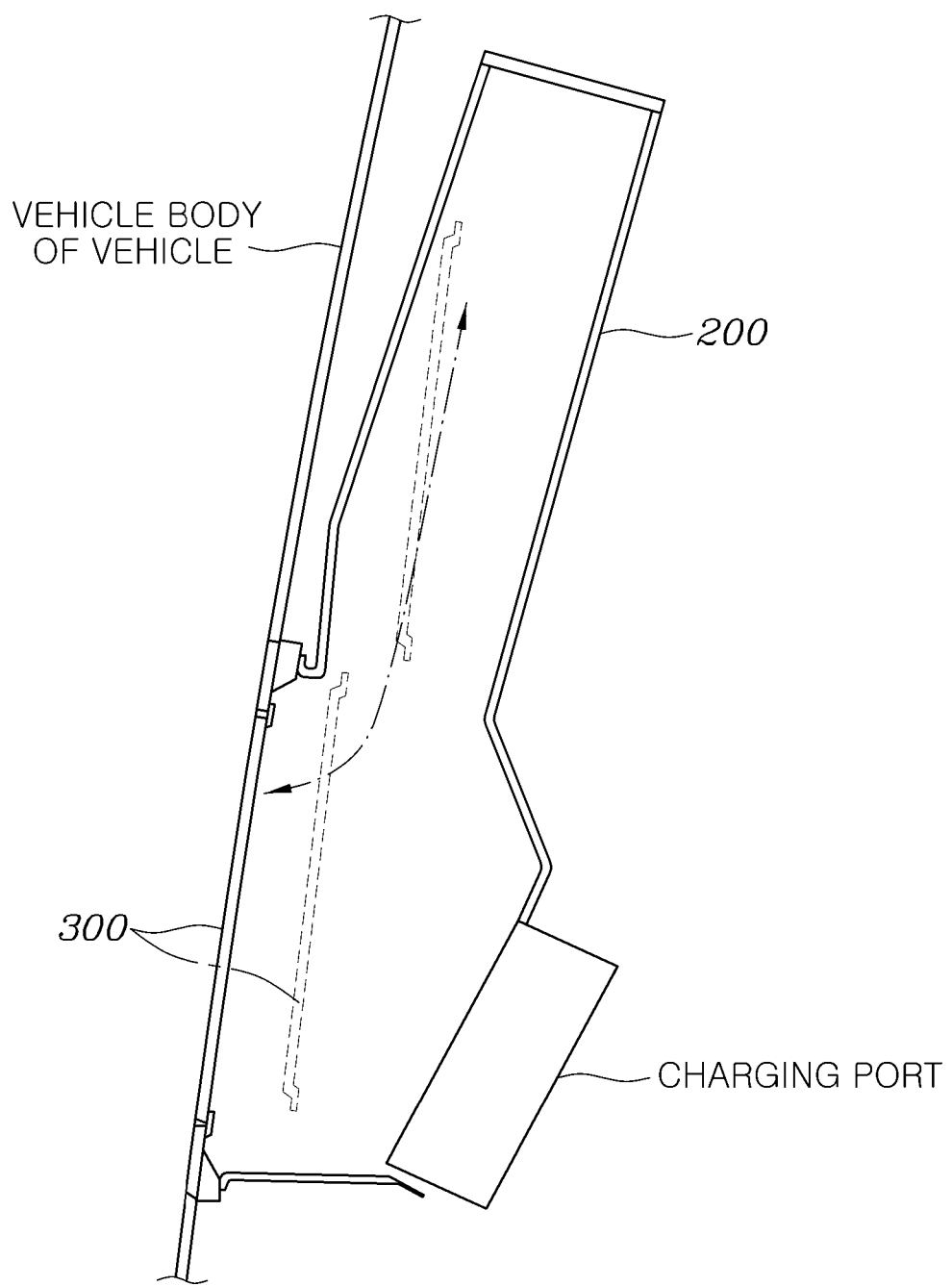
FIG. 2 is a conceptual diagram illustrating an operation in which the charging door is opened into the charging hole according to an exemplary embodiment of the present invention.
Figure 3:
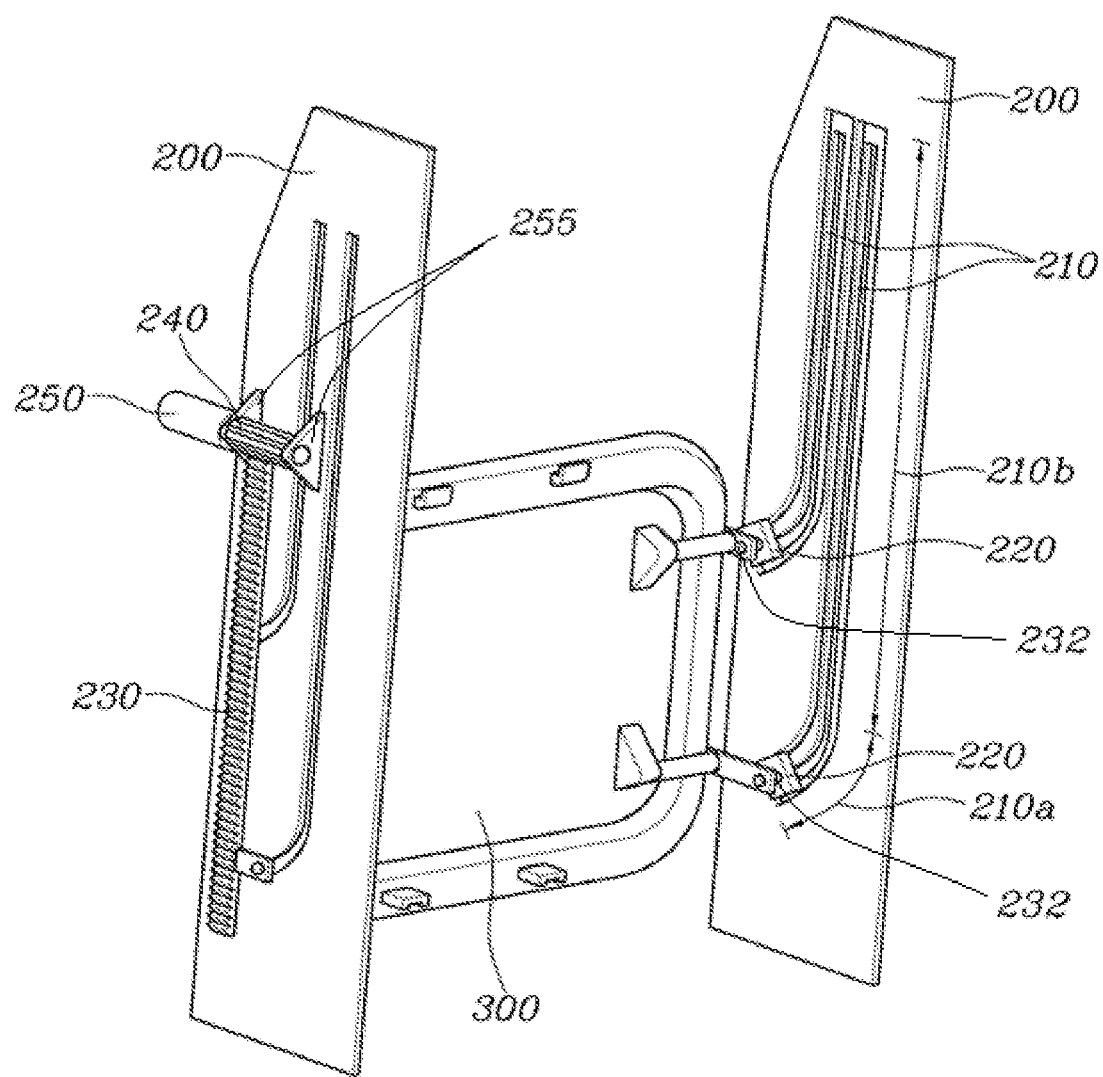
FIG. 3 is a diagram illustrating a shape at a closed position of the charging door according to an exemplary embodiment of the present invention.

FIG. 1 is a diagram illustrating a state before a charging door 300 is coupled to a charging hole 100 according to an exemplary embodiment of the present invention, FIG. 2 is a conceptual diagram illustrating an operation in which the charging door 300 is open into the charging hole 100 according to an exemplary embodiment of the present invention, and FIG. 3 is a diagram illustrating a shape at a closed position of the charging door 300 according to an exemplary embodiment of the present invention.

According to FIG. 1, FIG. 2, and FIG. 3, the present invention includes a guide rail 210 mounted to be long inside the charging hole 100 in a longitudinal direction thereof, an actuator 250 for providing a driving force, and the charging door 300 for opening the charging hole 100 by being concealed and moved inside the charging hole 100 along the guide rail 210 according to the driving force received from the actuator 250 in a closed state by the charging hole 100.

To describe in detail with reference to the drawings, the charging hole 100 of a hole shape is formed on an external side of a vehicle body of a vehicle, and a charging port to which a charging gun (a charge connector) is connected is provided in the charging hole 100.

Furthermore, the charging door 300 may be formed in a shape corresponding to that of the charging hole 100 to close the charging hole 100.

Since the guide rail 210 is mounted in the charging hole 100 in a vertical length direction thereof, the charging door 300 is vertically guided and moved along the guide rail 210 in the charging hole 100, and thus the charging door 300 is moved to an upper side in the charging hole 100 to open the charging hole 100.

Here, the actuator 250 for moving the charging door 300 may be a motor. A driving force of the motor may be transmitted to the charging door 300 through power transmission parts, which will be described below, to vertically move the charging door 300.

For reference, the present invention may be preferably applied to an electric vehicle using electrical energy as a driving source but may also be applicable to an oil filling port of an engine vehicle using petroleum energy as fuel.

That is, according to the above configuration, when the actuator 250 operates for opening the charging door 300, a driving force received from the actuator 250 is provided to the charging door 300. Accordingly, the charging door 300 is moved along the guide rail 210, moved in a direction in which the charging door 300 is inserted into the charging hole 100, and then moved to the upper side in the charging hole 100.

As described above, since the charging door 300 is concealed and moved in the charging hole 100 so that the charging hole 100 is opened, when the charging gun enters the charging hole 100, interference due to the charging door 300 is prevented as well as an entering space for the charging gun is sufficiently secured to prevent damage to the charging parts, and the opening structure of the charging door 300 is upgraded to improve marketability of the vehicle.

Figure 4:
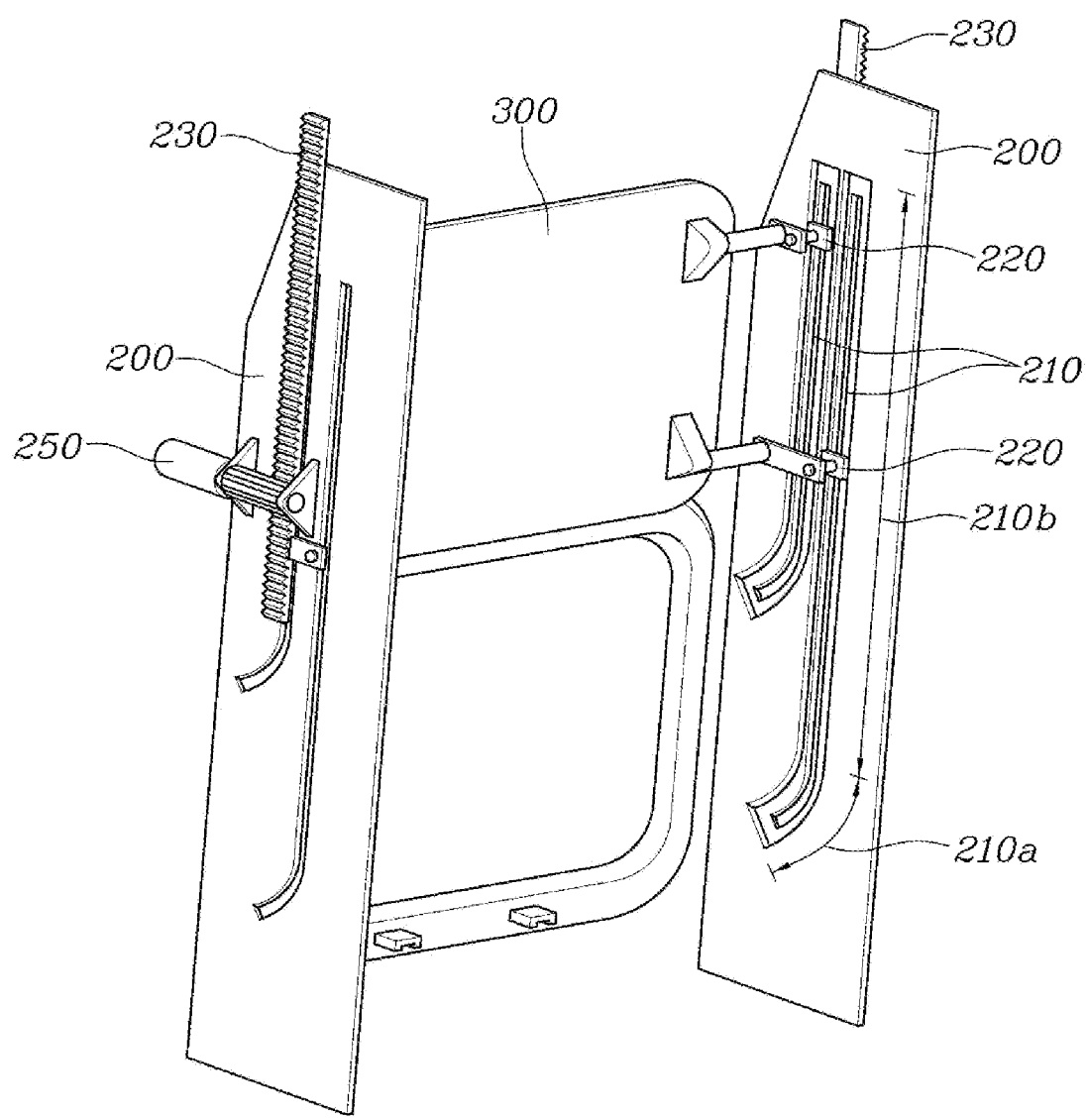
FIG. 4 is a diagram illustrating a shape at an opened position of the charging door according to an exemplary embodiment of the present invention.

FIG. 3 is a diagram illustrating a shape at a closed position of the charging door 300 according to an exemplary embodiment of the present invention, and FIG. 4 is a diagram illustrating a shape at an opened position of the charging door 300 according to an exemplary embodiment of the present invention.

Referring to the drawings, the guide rail 210 includes a pivoting guide section 210*a* formed in an arc shape from the charging hole 100 toward the charging port and configured to pivotally move the charging door 300, and a linear guide section 210*b* formed to extend linearly from an end portion of the pivoting guide section 210*a* and configured to linearly move the charging door 300.

That is, one end portion of the guide rail 210 is located adjacent to the charging hole 100, and the pivoting guide section 210*a* is formed to rise in an arc shape from one end portion of the guide rail 210 to an intermediate end portion thereof.

Furthermore, the linear guide section 210*b* is formed to rise in a linear shape from the intermediate end portion of the guide rail 210 to the other end portion thereof.

Therefore, the charging door 300 is guided and moved in the charging hole 100 while being rotated along the pivoting guide section 210*a* at an initial opening of the charging door 300, and subsequently, the charging door 300 is linearly moved upward along the linear guide section 210*b* connected to the pivoting guide section 210*a* so that the charging hole 100 may be open.

For reference, in an exemplary embodiment of the present invention, the guide rail 210 being formed in a longitudinal direction of the upper portion of the charging hole 100 and thus the charging door 300 being moved upward have been illustrated, but this is only an exemplary example. In consideration of an internal package of the vehicle or a design characteristic thereof, the guide rail 210 may be configured to be mounted toward a lower portion of the charging hole 100 or both side portions thereof to move the charging door 300 to the lower portion or both the side portions.

Figure 5:
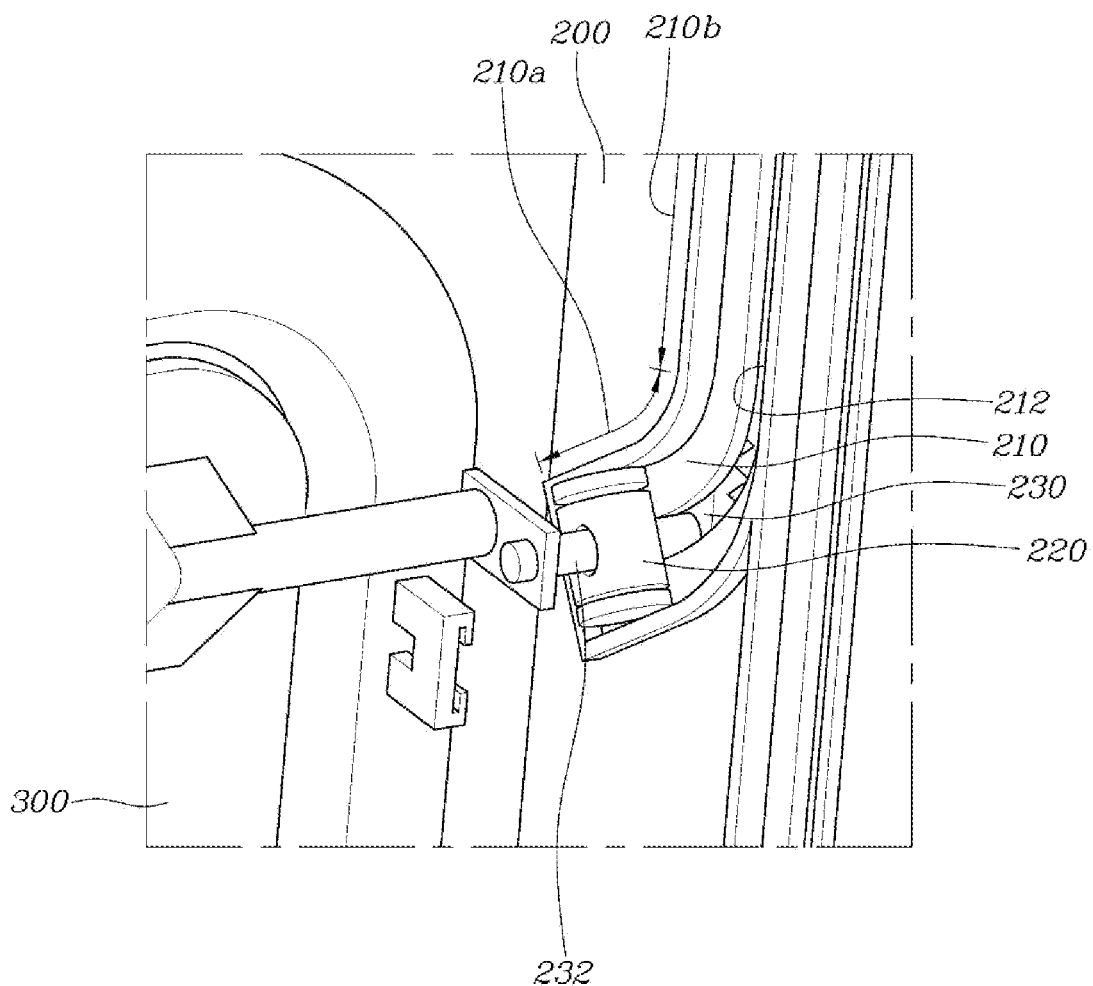
FIG. 5 is a diagram illustrating a coupling structure of the charging door, a guide roller, and a rack gear, and a guide structure due to a guide rail according to an exemplary embodiment of the present invention.

FIG. 5 is a diagram illustrating a coupling structure of the charging door 300, a guide roller 220, and a rack gear 230, and a guide structure due to the guide rail 210 according to an exemplary embodiment of the present invention;

Referring to the drawing, a structure is configured such that the guide roller 220 moving along the guide rail 210 is provided, the driving force of the actuator 250 is provided to one end portion of the guide roller 220, and the charging door 300 is coupled to the other end portion of the guide roller 220 so that the charging door 300 is moved together with the guide roller 220.

Groove-shaped guide rails 210 are formed on internal surfaces of the rail housing 200, which will be described below, and are inserted such that both end portions of each of the guide rollers 220 are located on both internal wall surfaces of the guide rails 210.

Furthermore, the driving force is received from the actuator 250 to one end portion of the guide roller 220 based on a gear engagement structure of the rack gear 230 and a pinion 240, which will be described later, and the guide roller 220 is coupled to the charging door 300 through a structure of a pin 232 so that the guide roller 220 may be moved while being rotated relative to the charging door 300.

That is, when the driving force is received from the actuator 250 to the guide roller 220, the guide roller 220 is guided and moved along the guide rail 210. Even when the guide roller 220 is rotated while passing through the pivoting guide section 210a, the charging door 300 is not pivoted due to the structure of the pin 232 and is moved only along paths of the pivoting guide section 210a and the linear guide section 210b in which the guide roller 220 is moved.

Figure 6:
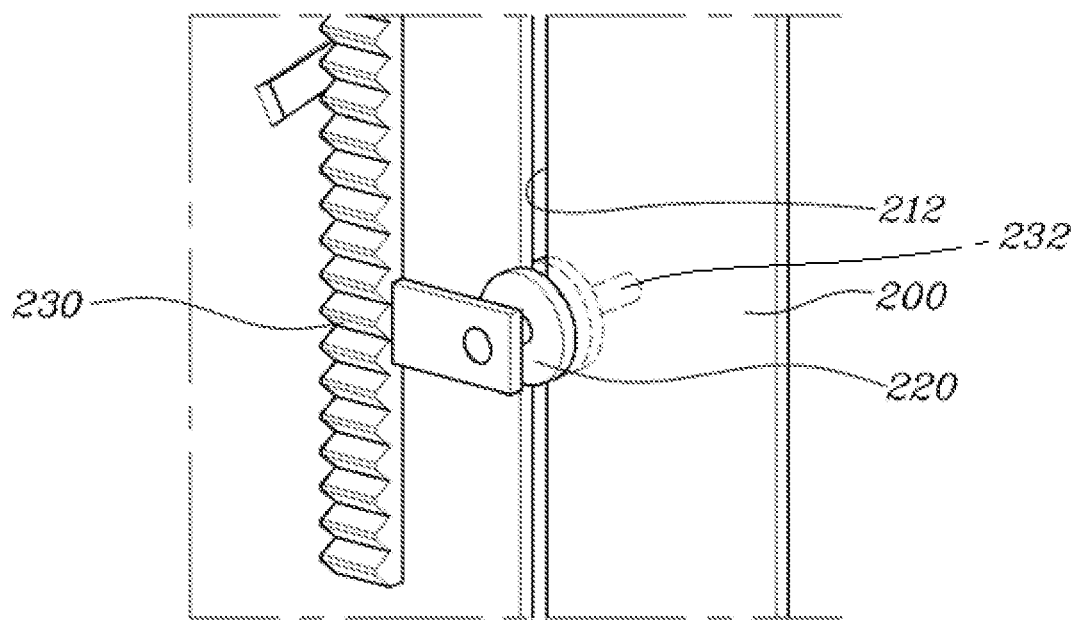
FIG. 6 is a diagram illustrating a structure of a guide roller according to various exemplary embodiments of the present invention.

Alternatively, the guide roller 220 may be provided of a structure according to another exemplary embodiment shown in FIG. 6.

Referring to the drawing, a guide slit 212 may be formed in a center portion along the path of the guide rail 210, and the guide roller 220 may be fitted to the guide slit 212.

A structure of a roller such as a sliding roller applied to a sliding door may be applied to the guide roller 220 according to operating noise and an opening and closing speed of the charging door 300, an output of the actuator 250, and the like. Furthermore, the guide roller 220 may be additionally mounted.

Figure 7:
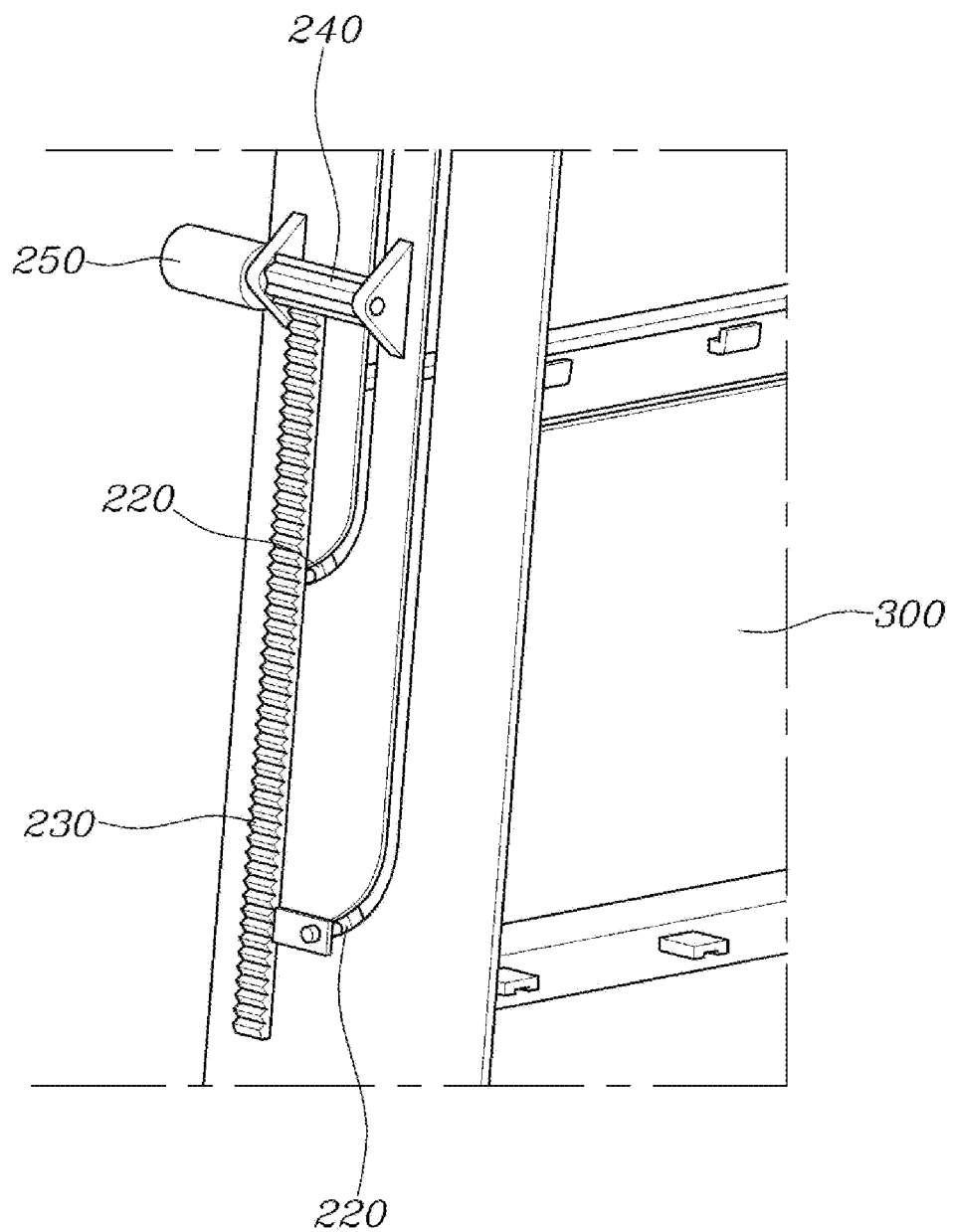
FIG. 7 is a diagram illustrating an engagement structure of the rack gear and a pinion according to an exemplary embodiment of the present invention.

FIG. 7 is a diagram illustrating an engagement structure of the rack gear 230 and the pinion 240 according to an exemplary embodiment of the present invention.

Referring to FIG. 7 together with FIG. 5, the rack gear 230 is coupled to one end portion of the guide roller 220, the rack gear 230 is provided in the same direction as the linear guide section 210b, the pinion 240 is engaged with the rack gear 230, and the actuator 250 is coupled to the pinion 240 so that the rack gear 230 is moved according to a rotational driving of the pinion 240.

The rack gear 230 is provided on an external surface of the rail housing 200, and the pin 232 provided at the rack gear 230 passes through the guide slit 212 to be hinged to the guide roller 220. The pin 232 may be hinged to the guide roller 220 to be coupled to the charging door 300.

Furthermore, the pinion 240 is disposed in the gear engagement structure on the external surface of the rail housing 200 located in an upper portion of the rack gear 230, and the actuator 250 is connected to a shaft of the pinion 240 which is rotatably fixed to support brackets 255 fixed to the rail housing 200 and spaced from each other.

That is, when the motor is driven, the rack gear 230 is moved in a linear direction as the pinion 240 is rotated. Thus, the guide roller 220 moves together with the rack gear 230, and the guide roller 220 moves along the guide rail 210 so that the charging door 300 may be moved in the charging hole 100.

However, when the guide roller 220 moves along the pivoting guide section 210a, the rack gear 230 is also moved along the pivoting guide path, and thus it is necessary to maintain the engagement structure between the rack gear 230 and the pinion 240 during the movement of the rack gear 230.

Thus, as shown in FIG. 7, in an exemplary embodiment of the present invention, a length of a shaft direction of the pinion 240 engaged with the rack gear 230 is formed to be greater than a length of a width direction of the rack gear 230 such that the rack gear 230 is moved in a width direction while being moved in the longitudinal direction during the movement of the rack gear 230 along the path of the pivoting guide section 210a.

That is, since a width of the pinion 240 is formed to be greater than a width of the rack gear 230, the rack gear 230 is moved upward, and simultaneously, horizontally moved along a shaft direction of the pinion 240 in the engagement state with the pinion 240 so that the rack gear 230 may be moved in the pivoting guide section 210a.

Furthermore, referring to FIG. 1, FIG. 2, and FIG. 3, in an exemplary embodiment of the present invention, a structure is configured such that the rail housings 200 are mounted on both internal sides of the charging hole 100, a plurality of guide rails 210 having the same guide path are formed on a front surface and a rear surface of each of the rail housings 200, the guide rollers 220 provided on the front surface and the rear surface of each of the guide rails 210 are coupled to an upper end portion and a lower end portion of the charging door 300.

The rail housings 200 of an enclosure shape protruding upward are coupled behind the charging door 300 and inserted into and mounted in the charging hole 100. Thus, the charging hole 100 is configured for being coupled to the charging door 300.

Furthermore, since both end portions of the rail housing 200 are mounted adjacent to both end portions of the charging hole 100, the guide rails 210 are formed at both the end portions of the rail housing 200, and thus a structure is configured such that the guide roller 220 is coupled to the charging door 300.

Since the guide rails 210 are formed in parallel on the front surface and the rear surface of the rail housings 200, the guide roller 220 being moved along the guide rail 210 on the front surface is coupled to the upper end portion of the charging door 300, and the guide roller 220 being moved along the guide rail 210 on the rear surface is coupled to the lower end portion of the charging door 300.

Therefore, since sway or rotation of the charging door 300 is restricted when moved, the charging door 300 is stably moved. Consequently, the charging door 300 may avoid interference with surrounding structures during the movement of the charging door 300.

Furthermore, in an exemplary embodiment of the present invention, a charging information portion 310 may be provided on a rim portion of the charging door 300. That is, a light garnish is provided on a rim portion of the charging door 300 to display charging information such as a charging progress state and an amount of charging so that marketability of the vehicle may be improved.

Figure 8:
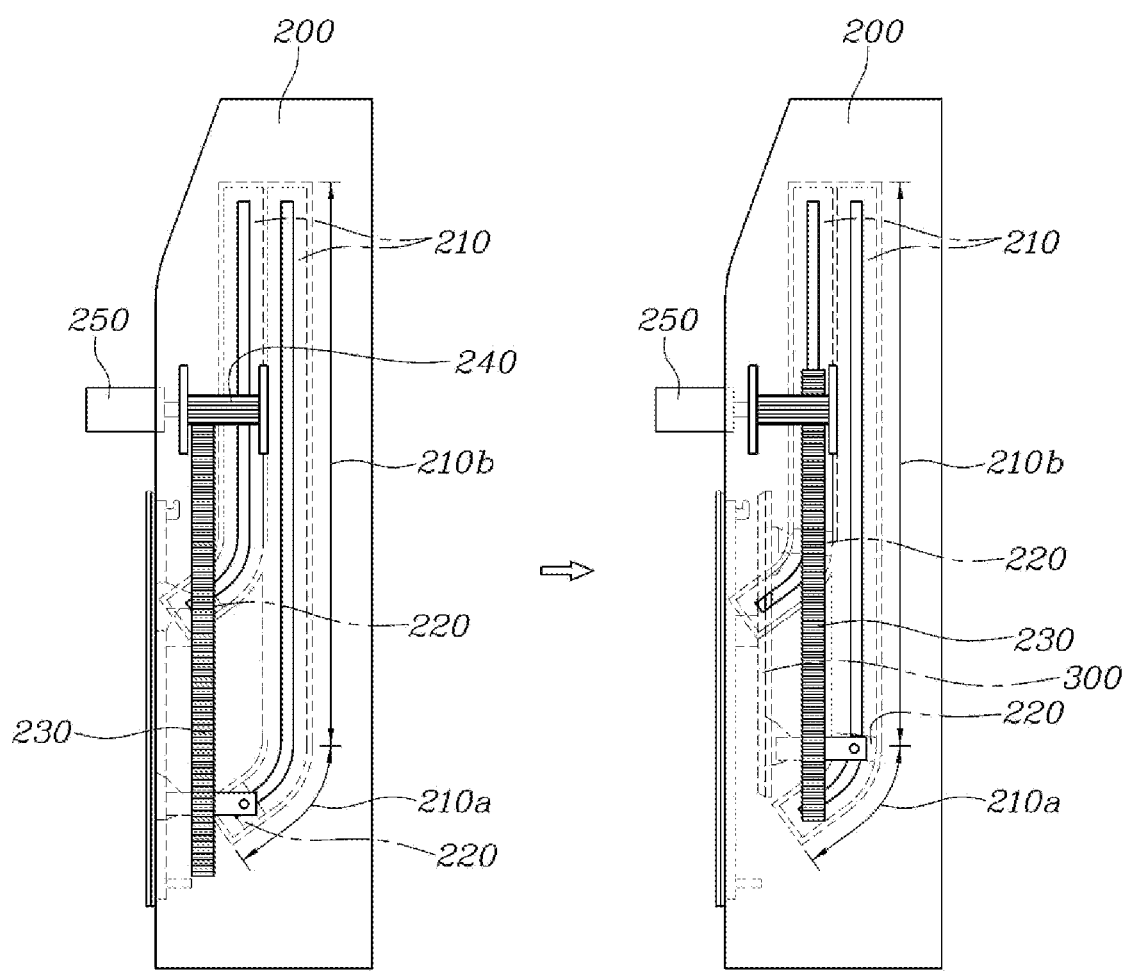
FIG. 8 is a diagram for describing an operation in which the charging door is moved and opened along a guide path of the guide roller according to an exemplary embodiment of the present invention.

To describe an operation of opening the charging door 300 in an exemplary embodiment of the present invention with reference to FIG. 8 together with FIG. 3 and FIG. 4 below, when charging of the vehicle is required and when the actuator operates the motor by performing an operation of a switch for opening or closing the charging door 300 or the vehicle enters a charging station, the motor may automatically operate to open or close the charging door 300.

Thus, when the motor is operated, the pinion 240 coupled to the motor is rotated, and the rack gear 230 engaged with the pinion 240 starts to be moved upwards.

Accordingly, as the guide roller 220 coupled to the rack gear 230 starts to be moved along the pivoting guide section 210a formed on the guide rail 210, the charging door 300 coupled to the guide roller 220 is also moved along the path of the pivoting guide section 210a and moved toward an interior of the charging hole 100.

In the instant case, the rack gear 230 is moved in the shaft direction of the pinion 240 and moved upwards.

Furthermore, as the operation of the motor continues, the guide roller 220 enters the linear guide section 210b from the pivoting guide section 210a, and accordingly, when the guide roller 220 is moved upward along the linear guide section 210b, the charging door 300 is also moved upward along the path of the linear guide section 210b to open the charging hole 100.

As described above, in an exemplary embodiment of the present invention, since the charging door 300 is concealed and moved in the charging hole 100 so that the charging hole 100 is opened, when the charging gun enters the charging hole 100, interference due to the charging door 300 is prevented as well as an entering space for the charging gun is sufficiently secured to prevent damage to the charging parts, and the opening structure of the charging door 300 is upgraded to improve marketability of the vehicle.

In an exemplary embodiment of the present invention, a pair of brackets 245 is connected to the rail housing 200 and the rack gear 230 is mounted between the brackets 245.

In an exemplary embodiment of the present invention, a controller is connected to at least one of the elements of the device configured for opening and closing a charging door such as the actuator 250 but not limited thereto, to control the operations thereof.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

In accordance with various aspects of the present invention, since a charging door is concealed and moved in a charging hole so that the charging hole is opened, when a charging gun enters the charging hole, there are effects in that interference due to the charging door is prevented as well as an entering space for the charging gun is sufficiently secured to prevent damage to charging parts, and an opening structure of the charging door is upgraded to improve marketability of a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for opening or closing a charging door, the device comprising:
a rail housing including a charging hole;
an actuator configured to provide a driving force; and
the charging door engaged to the actuator and configured to be selectively movable on the charging hole through a portion of the charging hole according to the driving force received from the actuator,
wherein the rail housing includes a guide rail formed on a surface of the rail housing along the charging hole in a longitudinal direction of the rail housing, wherein the charging door is movable along the guide rail,
wherein the guide rail includes:
a pivoting guide section curved in a curvature, wherein the charging door is configured to pivot and move along the pivoting guide section; and
a linear guide section formed to extend linearly from a distal portion of the pivoting guide section, wherein the charging door is configured to linearly move along the linear guide section,
wherein the device further includes a guide roller coupled to the charging door, slidably engaged to the guide rail and configured to move along the guide rail,
wherein the actuator is engaged to a first end portion of the guide roller and the driving force of the actuator is provided to the first end portion of the guide roller,
wherein the charging door is coupled to a second end portion of the guide roller and moved with the guide roller along the guide rail,
wherein the device further includes a rack gear coupled to the first end portion of the guide roller and a pinion connected to the actuator and engaged with the rack gear,
wherein the rack gear is aligned along the linear guide section,
wherein the rack gear is moved according to a rotational driving of the pinion, and
wherein a shaft of the pinion includes a plurality of teeth along an entire length of the shaft of the pinion, and the entire length of a shaft direction of the pinion engaged with the rack gear is formed to be greater than a length of a width direction of the rack gear so that the rack gear is moved in the width direction while being moved in the longitudinal direction during the movement of the rack gear along a path of the pivoting guide section.

2. The device of claim 1, wherein the charging door is configured to be concealed and moved in the charging hole along the guide rail according to the driving force received from the actuator in a state of being closed to open the charging hole.

3. The device of claim 1, wherein the pivoting guide section is formed in an arc shape from the charging hole toward a charging port to form the curvature.

4. The device of claim 1, further including a pair of brackets connected to the rail housing,
wherein the rack gear is engaged to the pinion between the brackets so that the rack gear is movable between the brackets.

5. The device of claim 1,
wherein a first pin is connected to an upper end portion of the charging door and slidably coupled to a first guide slot of the railing housing, and
wherein a second pin is connected to a lower end portion of the charging door and slidably coupled to a second guide slot of the rail housing.

6. The device of claim 1,
wherein first and second guide rails are formed on a surface of the rail housing; and
wherein first and second guide rollers are provided on the first and second guide rails, respectively,
wherein a first pin is connected to an upper end portion of the charging door and slidably coupled to the first guide roller, and
wherein a second pin is connected to a lower end portion of the charging door and slidably coupled to the second guide roller.

7. The device of claim 1,
wherein first and second guide rails are formed on a surface of the rail housing; and
wherein first and second guide rollers are provided on the first and second guide rails, respectively,
wherein a first pin is connected to an upper end portion of the charging door and slidably coupled to a first guide slot formed on the first guide rail, and
wherein a second pin is connected to a lower end portion of the charging door and slidably coupled to a second guide slot formed on the second guide rail.

8. The device of claim 1,
wherein a first pin is connected to an upper end portion of the charging door and slidably coupled to a first guide slot formed on the rail housing, and
wherein a second pin is connected to a lower end portion of the charging door and slidably coupled to a second guide slot formed on the rail housing.

9. The device of claim 1,
wherein the rail housing is formed in plural to include rail housings mounted on first and second internal sides of the charging hole;
wherein the guide rail is formed in plural to include first and second guide rails having a same guide path and formed on a front surface and a rear surface of each of the rail housings; and
wherein first and second guide rollers are provided on the first and second guide rails, respectively and coupled to an upper end portion and a lower end portion of the charging door, respectively.

10. The device of claim 1, wherein a charging information portion is provided at a rim portion of the rail housing.

11. The device of claim 1, further including:
a pin connected to the charging door, wherein a distal end of the pin is slidably coupled to the portion of the rail housing;
the rack gear coupled to an end of the pin; and
the pinion connected to the actuator and engaged with the rack gear;
a pair of brackets connected to the rail housing,
wherein the rack gear is engaged to the pinion between the brackets so that the rack gear is movable between the brackets.

12. The device of claim 11, wherein the rail housing includes a guide slot to which the distal end of the pin is slidably coupled.

13. The device of claim 11,
wherein the guide roller is rotatably mounted on the pin, and
wherein the rail housing includes the guide rail to which the guide roller is slidably mounted.

14. The device of claim 11,
wherein the guide roller is rotatably mounted on the pin,
wherein the rail housing includes the guide rail to which the guide roller is slidably mounted, and
wherein the guide rail includes a guide slot to which the distal end of the pin is slidably coupled.

* * * * *